United States Patent
Cannet et al.

(10) Patent No.: US 7,591,276 B2
(45) Date of Patent: Sep. 22, 2009

(54) EXPANSION VALVE BLOCK WITH COORDINATED HIGH- AND LOW-PRESSURE CIRCUIT CONTROL MEANS

(75) Inventors: Gilles Cannet, Parmain (FR); Clarisse L'Heveder, Shangai (CN)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 401 days.

(21) Appl. No.: 10/560,195

(22) PCT Filed: Jun. 18, 2004

(86) PCT No.: PCT/FR2004/001526

§ 371 (c)(1),
(2), (4) Date: Dec. 8, 2005

(87) PCT Pub. No.: WO2005/001590

PCT Pub. Date: Jan. 6, 2005

(65) Prior Publication Data

US 2006/0137748 A1 Jun. 29, 2006

(30) Foreign Application Priority Data

Jun. 25, 2003 (FR) .................................... 03 07672

(51) Int. Cl.
*G05D 16/06* (2006.01)

(52) U.S. Cl. ....................... 137/1; 137/613; 137/505.25
(58) Field of Classification Search ................. 137/613, 137/505.25, 1
See application file for complete search history.

(56) References Cited

U.S. PATENT DOCUMENTS

| 3,213,888 | A | 10/1965 | Cameron et al. | |
| 4,197,876 | A | 4/1980 | Lobdell | |
| 6,892,953 | B2 * | 5/2005 | Matsuda et al. | 137/613 |
| 6,959,724 | B2 * | 11/2005 | Heiderman | 137/494 |

FOREIGN PATENT DOCUMENTS

| EP | 0 745 918 | 12/1996 |
| FR | 2 537 243 | 6/1984 |

OTHER PUBLICATIONS

International Search Report for PCT/FR2004/001526.

* cited by examiner

*Primary Examiner*—Kevin L Lee
(74) *Attorney, Agent, or Firm*—Donna Blalock Holguin

(57) ABSTRACT

The invention relates to an expansion valve block which is equipped with coordinated means (8) for isolating the high-pressure circuit (3) and the low-pressure circuit (4) such that, when the gas delivery inlet is opened and closed, the two circuits are automatically controlled using the sequence that best guarantees the immunity of the installation.

29 Claims, 2 Drawing Sheets

EXPANSION VALVE BLOCK WITH COORDINATED HIGH- AND LOW-PRESSURE CIRCUIT CONTROL MEANS

This application is a § 371 of International PCT Application PCT/FR2004/001526, filed Jun. 18, 2004.

FIELD OF THE INVENTION

The present invention relates to an expansion valve block allowing the pressure or flow rate of a fluid to be controlled or adjusted and which is particularly well suited to the delivery of gas of a precise composition.

BACKGROUND

Expansion valves are commonly used for bringing a gas from its transport or storage pressure to its service pressure. Control over the impact that expansion valves have on the chemical composition of the gases they deliver is important because it is known that expansion valves can have an impact on the composition of the gases passing through them. This impact is a detrimental impact when using gases or mixtures of gases the composition of which needs to be known precisely, or the purity of which needs to be strictly preserved, such as gases in laboratories and analysis gases and the gases used in electronics. It may also have an impact on gases that may present a danger when mixed with other gases or with the ambient air: it is necessary to control their delivery in order to avoid any dangerous mixture. This is the case, for example, with fuel gases such as hydrogen or acetylene which may form explosive mixtures with ambient air. Contamination of the delivered gas also occurs when the delivery of the gas by the expansion valve is interrupted: the high-pressure upstream circuit of the expansion valve is closed, the low-pressure downstream circuit ceases to be supplied, and ambient air or other substances can enter the low-pressure circuit and the measurement and safety accessories.

Expansion valves are complex pieces of equipment comprising a high-pressure circuit and a low-pressure circuit which circuits consist of chambers and ducts, regulators (shutters, diaphragms, bellows or pistons), pressure gauges, safety means (valves, rupture disks, etc.). Known techniques for controlling the purity of the delivered gas are, for example:
- the choice of sealing techniques, of materials used for the body of the expansion valve, seals, regulators (elastomeric diaphragms or metal bellows),
- control of the quality of the surfaces, of the rinsing and passivation procedures and of the assembly conditions,
- reduction of dead volumes,
- the type of cleaning.

In order to avoid the risks of contamination it is also possible to employ special gas delivery procedures (purging, rinsing by compression and expansion, operating procedure), but these are often lengthy and painstaking and operational errors are possible.

Finally, a gas nonreturn device may be installed at the exit from the expansion valve in order to avoid contamination of the low-pressure circuit by undesirable ingress, but this solution introduces a pressure drop in the delivery circuit and the sealing solutions used in such devices do not guarantee against microingresses of gas ($10^7$ mbar·l/s).

SUMMARY OF THE INVENTION

The present invention provides an expansion valve block for controlling or adjusting the pressure or flow rate of a fluid. The expansion valve block comprises a main body within which at least one internal fluid passage between at least one fluid inlet orifice and at least one fluid outlet orifice is formed; at least one fluid-pressure control means arranged on at least part of said internal fluid passage, the internal fluid passage between said pressure control means and the fluid inlet orifice forming an upstream circuit and the internal fluid passage between said pressure control means and the fluid outlet orifice forming a downstream circuit; at least one first fluid flow rate control means arranged on at least part of the downstream circuit; at least one second fluid flow rate control means arranged on at least part of the upstream circuit; and at least one command means for causing a fluid to flow in the passage, wherein the command means collaborates with the first and second fluid flow rate control means in such a way that, when the operator commands delivery of a fluid in the passage, the opening of the upstream circuit by the second control means occurs before the opening of the downstream circuit by the first control means and, when the operator commands the stopping of the delivery of a fluid in the passage, closure of the downstream circuit by the first control means occurs before closure of the upstream circuit by the second control means. The present invention further provides a pressurized-fluid vessel equipped with said expansion valve block. The present invention even further provides a method for delivering a fluid in an expansion valve block and a method for stopping delivery of a fluid in an expansion valve block.

DETAILED DESCRIPTION OF THE INVENTION

Figure 1:
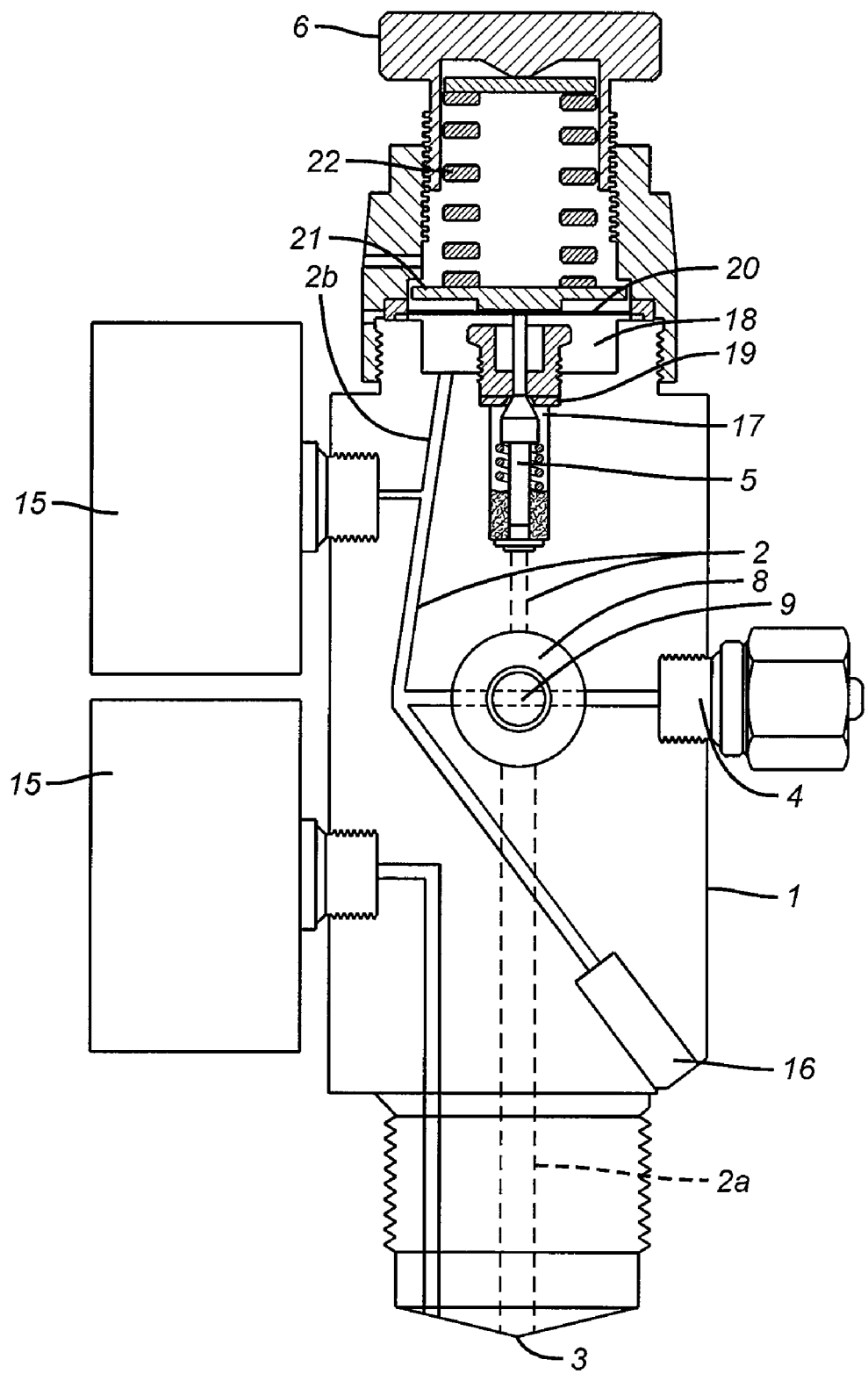
FIG. 1 provides a view in cross section of the expansion valve block according to the invention.

One object of the present invention is to propose an expansion valve allowing a gas to be delivered without alteration to the composition of this gas.

Another object of the present invention is to propose an expansion valve allowing a gas to be delivered without alteration to the composition of this gas even at the time of closing or opening the expansion valve.

Another object of the present invention is to propose an expansion valve that allows a gas to be delivered without alteration to the composition of this gas and the use of which does not permit any operational error.

To these ends, the invention consists in providing the expansion valve with coordinated means for isolating the high-pressure circuit and the low-pressure circuit so that, upon opening the delivery of gas, and on closing it, the two circuits are systematically commanded in a sequence that guarantees the installation the best possible immunity.

The invention therefore relates first of all to an expansion valve block for controlling or adjusting the pressure or the flow rate of a fluid, comprising,
- a main body within which at least one internal fluid passage between at least one fluid inlet orifice and at least one fluid outlet orifice is formed,
- at least one fluid-pressure control means arranged on at least part of said internal fluid passage, the internal fluid passage between said pressure control means and the fluid inlet orifice forming an upstream circuit and the internal fluid passage between said pressure control means and the fluid outlet orifice forming a downstream circuit, at least one first fluid flow rate control means arranged on at least part of the downstream circuit, at least one second fluid flow rate control means arranged on at least part of the upstream circuit, at least one command means for causing a fluid to flow in the passage, and in which the command means collaborates with the first and second fluid flow rate control means in such a way that, when the operator commands delivery of a fluid in the passage, the opening of the upstream circuit by the second control means occurs before the opening of the downstream circuit by the first control means and, when the operator commands the stopping of the delivery of a fluid in the passage, closure of the downstream circuit by the first control means occurs before closure of the upstream circuit by the second control means.

The flow rate control means allow the internal passage to be open and closed either on the upstream circuit or on the downstream circuit. The second fluid flow rate control means arranged on at least part of the upstream circuit may be a valve with an axially moving shutter. This type of flow rate control means allows the cross section of the internal fluid passage in the upstream circuit to be plugged or uncovered according to its movement.

For preference, the first fluid flow rate control means arranged on at least part of the downstream circuit is a cylinder right through which a duct is radially pierced, said cylinder being placed in a bore in the body of the expansion valve block. The cylinder, according to its axial orientation, makes it possible:

either to place the downstream circuit in communication with the fluid outlet orifice when one end of the duct is collaborating with the downstream circuit and the other end of the duct is collaborating with the outlet orifice of the expansion valve block, or to close the communication between the downstream circuit and the outlet orifice of the expansion valve block.

According to the preferred embodiment of the invention, one of the bases of the cylinder is the axially moving shutter of the second fluid control means arranged on at least part of the upstream circuit. In this preferred embodiment, the first and second fluid flow rate control means are combined within the cylinder:

the first means corresponding to the part of the cylinder that is pierced radially right through by a duct, the second means corresponding to the base of the cylinder.

The means for commanding the circulation of a fluid in the internal passage of the main body may be a screw collaborating with the cylinder/cylinder and the shutter in such a way that turning it simultaneously causes axial translational movement of the shutter and axial rotation of the cylinder.

The surface of the cylinder/cylinder may be covered with a material which provides sealing between the plug/cylinder and the main body of the expansion valve block.

The base of the cylinder may be hollowed out around its annular periphery and a seal may be positioned in this annulus.

The pressure control means may comprise at least one shutter and/or at least one spring, or the pressure control means may comprise a pressure relieving screw or a cam acting on at least one shutter.

The block may comprise a moving lever that can be manipulated by the operator between at least one fluid flow rate open and at least one fluid flow rate closed position, said lever acting on the command means.

The invention also relates to a pressurized-fluid vessel, particularly a gas cylinder, equipped with an expansion valve block as defined hereinabove.

The invention also relates to a method for delivering a fluid in an expansion valve block, said expansion valve block comprising an upstream circuit and a downstream circuit in which the pressure is below the pressure in the upstream circuit, in which when the operator commands the delivery of fluid, the opening of the upstream circuit occurs before the opening of the downstream circuit.

The invention finally relates to a method for stopping delivery of a fluid in an expansion valve block, said expansion valve block comprising an upstream circuit and a downstream circuit in which the pressure is below the pressure in the upstream circuit, in which when the operator commands the stopping of the delivery of the fluid, closure of the downstream circuit occurs before closure of the upstream circuit.

Figure 2:
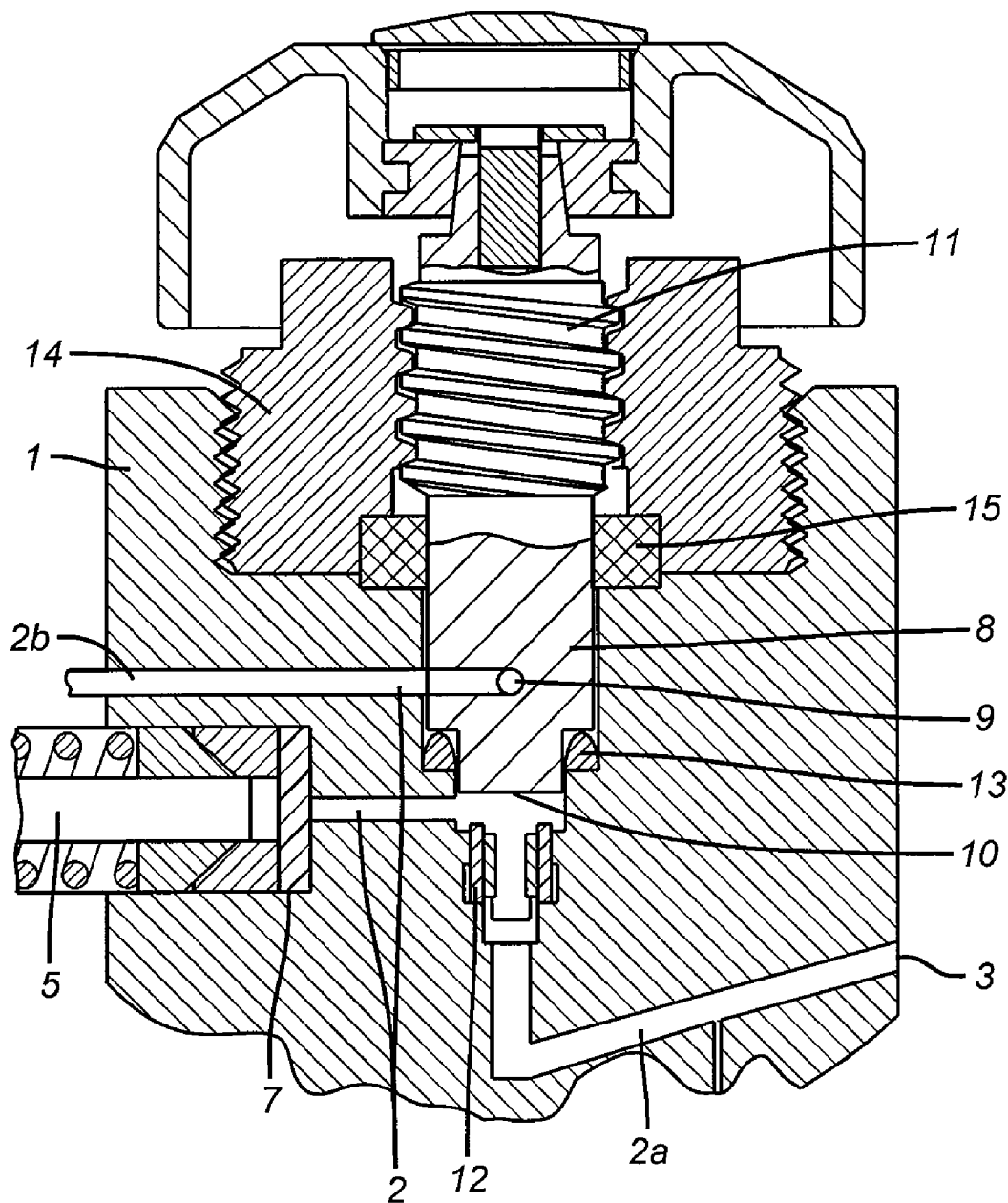
FIG. 2 provides a partial sectional view of the expansion valve block according to the invention.

In practical terms, the solution of the invention is that it proposes an expansion valve the operation of which is explained hereinafter in conjunction with the attached figures in which:

FIG. 1 is a view in cross section of the expansion valve block according to the invention;

FIG. 2 is a partial sectional view of the expansion valve block according to the invention.

The expansion valve comprises a main body 1 within which at least one internal passage 2 is formed. This passage 2 has an inlet orifice 3 which generally collaborates with that side of the vessel to which the expansion valve block is fixed, and an outlet orifice 4 which generally collaborates with a gas dispensing means. The expansion valve comprises a means 5 for controlling the pressure of the fluid flowing through the internal passage 2. In the upstream circuit 2a situated between this pressure control means 5 and the inlet orifice 3, the fluid has a high pressure. In the downstream circuit 2b situated between this pressure control means 5 and the outlet orifice 4 the fluid has a pressure that is lower than it is upstream, the pressure control means 5 allowing the pressure of the fluid from the orifice 3 to be lowered. The pressure control means here is an expansion valve shutter 5 moved by a screw 6. Behind the expansion valve shutter there is the high pressure chamber 17 of the expansion valve, which opens onto the low-pressure chamber 18 of the expansion valve. The valve shutter 15 rests on a packing 19 such that the combined effect of the shutter 5 and of the packing 19 provides sealing between the high-pressure chamber 17 and the low-pressure chamber 18 of the expansion valve. The downstream end of the valve shutter 5 rests on a diaphragm 20, itself pushed by a plate 21 under the effect of a spring 22 compressed by the screw 6. When the pressure of the gas in the low-pressure chamber 18 is below the setpoint value, the combination of the spring 22 and of the plate 21 pushes the shutter 5 back; the latter therefore moves away from the packing 19 and allows the gas to pass from the high-pressure chamber 17 to the low-pressure chamber 18, so the pressure in the chamber 18 rises. As soon as the pressure in the low-pressure chamber 18 reaches the setpoint value, the diaphragm 20 pushes the plunger 21 back and the shutter 5 returns into contact with the packing 19 so as to close off the gas passage. The screw 6 is adjusted in such a way as to set the setpoint value and therefore the desired pressure for the delivered gas, control being possible by reading the pressure off the pressure gauge 15 of the downstream circuit 2b. A filter 7 may be placed in contact with the expansion valve shutter 5. The cylinder 8 combines the functions of controlling the flow rate of the fluid flowing in the upstream circuit 2a and in the downstream circuit 2b. In fact it is radially pierced right through by a duct 9 so that when one of the ends of this duct 9 is in communication with the upstream circuit 2b, the other end of this duct is in communication with the outlet orifice 4. In addition, this cylinder 8 may undergo a translational movement along its axis in such a way that its end 10 situated at the same end as the upstream circuit 2a either does or does not close this upstream circuit. The command means for operating the plug is a screw 11 which:

by being turned, positions the duct 9 in such a way as to either allow or prevent communication between the orifice 4 and the circuit 2b, through its translational movement, closes or opens the upstream circuit 2a.

The pitch of the screw needs to be fixed in such a way that, when the operator begins to command delivery of fluid into the passage 2, he unscrews the screw 11 in such a way that:

first, the translational movement of the screw axially moves the cylinder 8 enough to allow the base 10 of the cylinder 8 to move and allow fluid to pass in the circuit 2a towards the expansion valve shutter 6, without the turning of the screw at the same time causing the cylinder to rotate through enough of an angle to allow communication between the orifice 4 and the circuit 2b, second, the translational movement of the screw continues to move the cylinder 8 axially in order to continue to allow fluid to pass in the circuit 2a toward the expansion valve shutter 6 and, at the same time, the turning of the screw allows the cylinder to be turned through enough of an angle to allow communication between the orifice 4 and the circuit 2b.

In consequence, first of all, the gas to be delivered circulates in the upstream circuit 2a and in the downstream circuit 2b as far as the cylinder 8, then the gas can flow in the duct 9 of the cylinder 8 and be delivered out of the expansion valve.

Likewise, when the operator begins to command closure of the delivery of fluid in the passage 2, he turns the screw 11 in such a way that:

first, the turning of the screw causes the cylinder to turn through enough of an angle in order no longer to allow communication between the orifice 4 and the circuit 2b without, at the same time, the translational movement of the screw moving the base 10 of the cylinder 8 axially far enough to block the passage of the fluid in the circuit 2a toward the expansion valve shutter 6, second, the turning of the screw continues to cause the cylinder to turn without allowing communication between the orifice 4 and the circuit 2b, and at the same time, the translational movement of the screw 11 continues to move the base 10 of the cylinder 8 axially until it is able to plug the passage of the fluid in the circuit 2a to ward the expansion valve shutter 6.

A packing 12 is placed in the downstream circuit 2a to collaborate with the base 10 of the cylinder 8 when this base 10 closes the upstream circuit 2a. A seal 13 is placed in the hollowed-out peripheral annulus of the base 10 of the cylinder 8.

The screw 11 collaborates with the cylinder 8 by way of a toric seal 14 which allows the screw to be incorporated into the expansion valve; nonetheless, it is possible also to screw the screw directly into the block 1 of the expansion valve. A sealing ring 15 is positioned around the cylinder 8 between the body 1 of the block and the toric seal 14. Two pressure gauges 15 allow the pressure within the upstream and downstream circuits 2a, 2b to be checked. A safety valve (or relief valve) 16 is provided in case the pressure within the internal passage 2 reaches too high a level. It may for example consist of a ball pressed firmly against a seat by a spring. The ball bears against the seat along a contact circle. The ball is subjected to the actions of the spring which tends to press it firmly against the seat and of the gas which tends to lift it off the seat. When the pressure exerted on the cross-sectional area of the circle of contact produces a force higher than the force of the spring, the gas escapes. As an alternative, use could be made of a metal diaphragm which tears under the effect of pressure.

The device has the advantage of providing dual closure: the upstream circuit and the downstream circuit are both closed. By employing a device as described hereinabove, the upstream valve of the device is opened before the downstream valve, and this allows the high-pressure and low-pressure circuits of the expansion valve to be pressurized before the valve begins to deliver gas to the user circuit. On closure, the downstream circuit is isolated first to prevent any ingress of contamination, then the upstream circuit is closed to interrupt the supply and prevent the risk of a rise in pressure in the low-pressure circuit in the event of leakage of the expansion valve shutter. This operation allows the circuits of the expansion valve block to be balanced and avoids any contamination of said circuits.

Thanks to the implementation of the device according to the invention, ambient air or the gas present in the distribution circuit downstream of the expansion valve does not suck back into the circuits of the expansion valve block.

The invention has the advantage of allowing the high-pressure and low-pressure circuits of the expansion valve block to be shut off in a single action.

By virtue of the invention, there is no longer any need to purge the circuits of the expansion valve using gas present in the cylinder between two uses; this gas is not wasted.

The invention makes it possible to avoid microingresses of ambient gas into the expansion valve.

The invention finally relates to a method for predicting the change in the composition of a gas or of a gaseous mixture contained in a vessel, in which method the following steps are repeated:

1—the technical characteristics of the vessel are established;

2—the vessel is filled with said gas or gaseous mixture and a prediction of the change in the composition of the gas or gaseous mixture is established on the basis of the technical characteristics of the vessel;

3—some of the gas or gaseous mixture contained in the vessel is used;

4—the gas or gaseous mixture contained in the vessel and which has not yet been used is analyzed;

5—the analysis of the gas or gaseous mixture contained in the vessel and which has not yet been used is compared against the prediction of the change in composition established during step 2;

6—the comparison at step 4 is used to establish a new prediction of the change in the composition of the gas or gaseous mixture for step 2.

During step 1, the technical characteristics of the vessel include the nature of the vessel, the nature and the method of internal surface treatment thereof.

The prediction of the change in the composition of the gas or gaseous mixture used during step 2 is established initially by introducing gas or gaseous mixture into the vessel then analyzing the composition delivered by the vessel and measuring the deviation with respect to the initial composition as a function of time. All the data relating to a vessel are stored in a database on the basis of which the prediction of the change in the composition of the gas or gaseous mixture can be refined each time the vessel is used again. During step 4, if there is a significant deviation between the analysis of the gas or gaseous mixture contained in the vessel and which has not yet been used, and the prediction of the change in the composition established during step 2, use of the vessel may be halted and the user who used it last may be informed of the drift in the composition of the gas or gaseous mixture against the prediction of step 2.

Advantageously, during step 3, the operator uses the gas or gaseous mixture contained in the vessel while at the same time taking account of the prediction of the change in the composition established during step 2. This procedure of predicting the change in the composition of a gaseous mixture contained in a vessel is particularly advantageous in the case of the gaseous mixtures used for calibrating the analyzer or in the case of gaseous mixtures the use of which requires knowledge of their precise composition, something which is the case, for example, with applications for inerting sensitive packages of products, the manufacture of electronic components, the filling of fluorescent tubes, the supply of gas to gas laser cavities, the verification of the operation of sensors or detectors (explosimeter alarm level for example).

What is claimed is:

1. An expansion valve block for controlling or adjusting the pressure or the flow rate of a fluid, comprising,
   a) a main body within which at least one internal fluid passage between at least one fluid inlet orifice and at least one fluid outlet orifice is formed;
   b) at least one fluid-pressure control means arranged on at least part of said internal fluid passage between said fluid inlet orifice and said fluid outlet orifice, such that the portion of said internal fluid passage between said pressure control means and the fluid inlet orifice forms an upstream circuit and the internal fluid passage between said pressure control means and the fluid outlet orifice forms a downstream circuit;
   c) at least one first fluid flow rate control means arranged on at least part of the downstream circuit;
   d) at least one second fluid flow rate control means arranged on at least part of the upstream circuit; and
   e) at least one command means for causing a fluid to flow in the passage,
   wherein the command means collaborates with the first and second fluid flow rate control means in such a way that, when an operator commands delivery of a fluid in the passage, the opening of the upstream circuit by the second control means occurs before the opening of the downstream circuit by the first control means and, when an operator commands the stopping of the delivery of a fluid in the passage, closure of the downstream circuit by the first control means occurs before closure of the upstream circuit by the second control means.

2. The block as claimed in claim 1, wherein the second fluid flow rate control means arranged on at least part of the upstream circuit is a valve with an axially moving shutter.

3. The block as claimed in claim 2, wherein the first fluid flow rate control means arranged on at least part of the downstream circuit comprises a cylinder having a base at one end of the cylinder, the cylinder being pierced radially therethrough by a duct and being placed in a bore in the body of the expansion valve block.

4. The block as claimed in claim 3, wherein one of the bases of the cylinder is the axially moving shutter of the second fluid control means arranged on at least part of the upstream circuit.

5. The block as claimed in claim 3, wherein the command means is a screw collaborating with the cylinder/cylinder and the shutter in such a way that turning the screw simultaneously causes axial translational movement of the shutter and axial rotation of the cylinder.

6. The block as claimed in claim 4, wherein the surface of the cylinder is covered with a material which provides sealing between the cylinder and the main body of the expansion valve block.

7. The block as claimed in claim 4, wherein the base of the cylinder further comprises a peripheral annulus that is hollowed out and a seal that is positioned in this peripheral annulus.

8. The block as claimed in claim 1, wherein the pressure control means comprises at least one shutter and/or at least one spring.

9. The block as claimed in claim 1, wherein the pressure control means comprises a pressure relieving screw or a cam acting on at least one shutter.

10. The block as claimed in claim 1, wherein said block further comprises a moving lever that can be manipulated by the operator between at least one fluid flow rate open and at least one fluid flow rate closed position, said lever acting on the command means.

11. A pressurized-fluid vessel equipped with an expansion valve block as claimed in claim 1.

12. The pressurized-fluid vessel of claim 11, wherein said vessel is a gas cylinder.

13. The block as claimed in claim 2, wherein the first fluid flow rate control means arranged on at least part of the downstream circuit comprises a cylinder having a base at one end of the cylinder, the cylinder being pierced radially therethrough by a duct and being placed in a bore in the body of the expansion valve block.

14. The block as claimed in claim 5, wherein the surface of the cylinder is covered with a material which provides sealing between the cylinder and the main body of the expansion valve block.

15. The block as claimed in claim 5, wherein the base of the cylinder further comprises a peripheral annulus that is hollowed out and a seal that is positioned in this peripheral annulus.

16. The block as claimed in claim 6, wherein the base of the cylinder further comprises a peripheral annulus that is hollowed out and a seal that is positioned in this peripheral annulus.

17. The block as claimed in claim 4, wherein the pressure control means comprises at least one shutter and/or at least one spring.

18. The block as claimed in claim 5, wherein the pressure control means comprises at least one shutter and/or at least one spring.

19. The block as claimed in claim 6, wherein the pressure control means comprises at least one shutter and/or at least one spring.

20. The block as claimed in claim 4, wherein the pressure control means comprises a pressure relieving screw or a cam acting on at least one shutter.

21. The block as claimed in claim 5, wherein the pressure control means comprises a pressure relieving screw or a cam acting on at least one shutter.

22. The block as claimed in claim 6, wherein the pressure control means comprises a pressure relieving screw or a cam acting on at least one shutter.

23. The block as claimed in claim 5, wherein said block further comprises a moving lever that can be manipulated by the operator between at least one fluid flow rate open and at least one fluid flow rate closed position, said lever acting on the command means.

24. The block as claimed in claim 6, wherein said block further comprises a moving lever that can be manipulated by the operator between at least one fluid flow rate open and at least one fluid flow rate closed position, said lever acting on the command means.

25. The block as claimed in claim 7, wherein said block further comprises a moving lever that can be manipulated by the operator between at least one fluid flow rate open and at least one fluid flow rate closed position, said lever acting on the command means.

26. A method for delivering a fluid in an expansion valve block, said expansion valve block comprising an upstream circuit, and a downstream circuit in which the pressure is below the pressure in the upstream circuit, a first control means for opening said downstream circuit, a second control means for opening said upstream circuit and a means for commanding the circulation of the fluid, wherein when an operator initiates the means for commanding the circulation of the fluid, the opening of the upstream circuit by the second control means occurs before the opening of the downstream circuit by the first control means.

27. The method of claim 26, wherein said means for commanding the circulation of the fluid is a screw.

28. A method for stopping delivery of a fluid in an expansion valve block, said expansion valve block comprising an upstream circuit and a downstream circuit in which the pressure is below the pressure in the upstream circuit, a first control means for opening said downstream circuit, a second control means for opening said upstream circuit and a means for commanding the circulation of the fluid, wherein when an operator initiates the means for commanding the circulation of the fluid by stopping of the delivery of the fluid, the closure of the downstream circuit by the first control means occurs before closure of the upstream circuit by the second control means.

29. The method of claim 28, wherein said means for commanding the circulation of the fluid is a screw.

\* \* \* \* \*